United States Patent
Lukes et al.

(10) Patent No.: US 10,195,723 B2
(45) Date of Patent: *Feb. 5, 2019

(54) TAPERED LOBULAR DRIVER AND FASTENER

(71) Applicant: INFASTECH INTELLECTUAL PROPERTIES PTE. LTD., Singapore (SG)

(72) Inventors: Richard W. Lukes, Calmer, IA (US); Donald K. Blaess, Cresco, IA (US); Sean Riskin, Pleasanton, CA (US)

(73) Assignee: Infastech Intellectual Properties Pte. Ltd, Singapore (SG)

( * ) Notice: Subject to any disclaimer, the term of this patent is extended or adjusted under 35 U.S.C. 154(b) by 26 days.

This patent is subject to a terminal disclaimer.

(21) Appl. No.: 15/240,690

(22) Filed: Aug. 18, 2016

(65) Prior Publication Data

US 2017/0050300 A1 Feb. 23, 2017

Related U.S. Application Data

(60) Provisional application No. 62/206,555, filed on Aug. 18, 2015.

(51) Int. Cl.
| | |
|---|---|
| *B25B 15/00* | (2006.01) |
| *B25B 21/00* | (2006.01) |
| *B25B 15/02* | (2006.01) |
| *B25B 23/00* | (2006.01) |
| *F16B 23/00* | (2006.01) |

(52) U.S. Cl.
CPC ............ *B25B 15/005* (2013.01); *B25B 15/02* (2013.01); *F16B 23/003* (2013.01); *F16B 23/0053* (2013.01)

(58) Field of Classification Search
CPC ... B25B 15/005; F16B 23/003; F16B 23/0053
USPC .......................................................... 81/460
See application file for complete search history.

(56) References Cited

U.S. PATENT DOCUMENTS

| | | | |
|---|---|---|---|
| 2,556,155 A | 6/1951 | Stellin | |
| 4,464,957 A * | 8/1984 | Gill | ..................... F16B 23/0023 81/460 |

(Continued)

OTHER PUBLICATIONS

International Search Report and Written Opinion for PCT/US16/47582.

*Primary Examiner* — Hadi Shakeri
(74) *Attorney, Agent, or Firm* — Kegler, Brown, Hill & Ritter Cp., LPA; Lorraine Hernandez

(57) ABSTRACT

A fastener system includes a fastener and a driver, each of which have three alternating lobes and troughs that define the drive surfaces. The three alternating lobes and troughs are each defined by an outer radius portion, a drive side transition, an inner transition radius, and a reverse drive portion. The fastener recess and the driver each also have a side wall defined by the outer transition radius that tapers at a taper angle relative to the rotational axis. The fastener side wall may taper at about 60°. The driver side wall may taper at about 60°. Alternatively, the driver side wall may taper at an angle at least 10° less than the taper angle of the recess side wall, such as 42°. The drive side transition defines a drive angle which may be between 0° and 5°.

14 Claims, 15 Drawing Sheets

(56) References Cited

U.S. PATENT DOCUMENTS

| | | | | |
|---|---|---|---|---|
| 4,970,922 A | * | 11/1990 | Krivec | B25B 15/005 |
| | | | | 81/451 |
| 5,598,753 A | * | 2/1997 | Lee | B25B 13/485 |
| | | | | 411/404 |
| 5,957,645 A | | 9/1999 | Stacy | |
| 6,886,433 B2 | * | 5/2005 | Totsu | B21K 1/46 |
| | | | | 411/404 |
| 2005/0172762 A1 | | 8/2005 | Suzuki | |
| 2009/0074536 A1 | | 3/2009 | Dilling | |
| 2009/0260489 A1 | | 10/2009 | Siong | |
| 2011/0048181 A1 | * | 3/2011 | Tsai | B25B 15/005 |
| | | | | 81/460 |
| 2013/0160616 A1 | | 6/2013 | Hughes et al. | |
| 2015/0000479 A1 | | 1/2015 | Lukes et al. | |

* cited by examiner

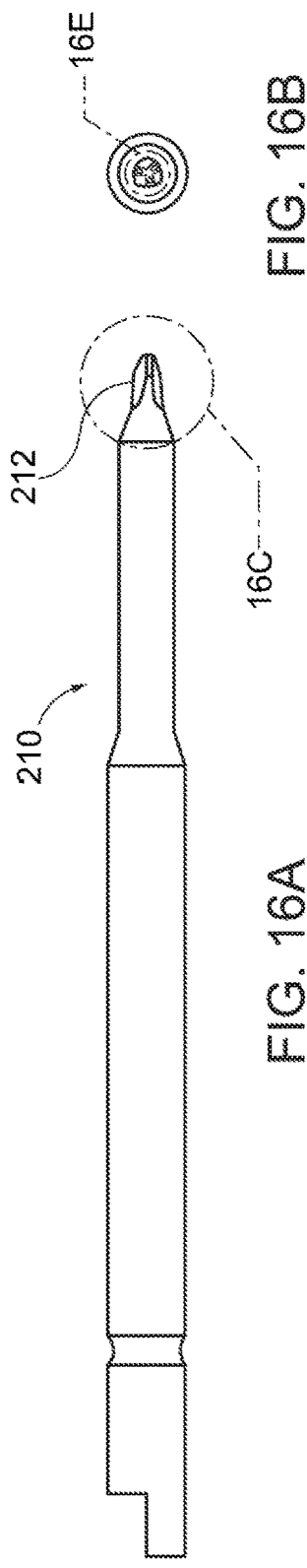
FIG. 16A
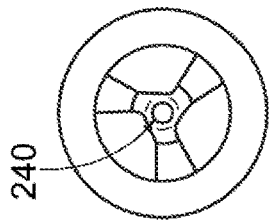
FIG. 16B
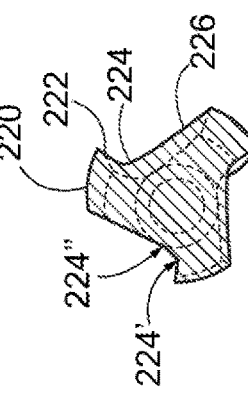
FIG. 16D
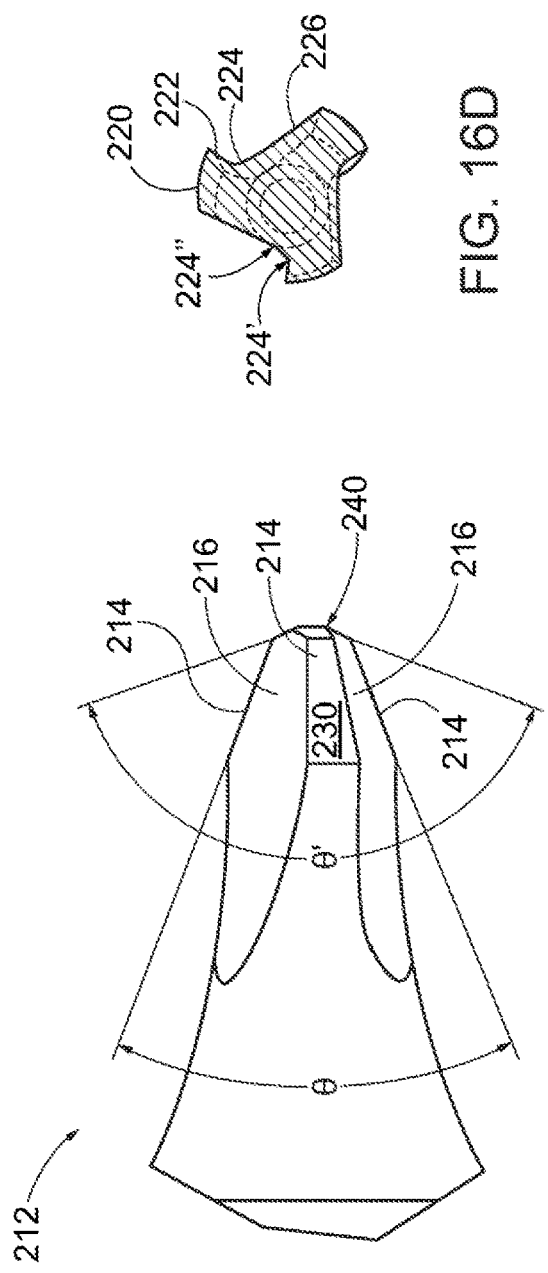
FIG. 16E
FIG. 16C

TAPERED LOBULAR DRIVER AND FASTENER

This non-provisional patent application claims priority to and the benefit of U.S. Provisional Patent Application Ser. No. 62/206,555 filed on Aug. 18, 2015, which is incorporated herein by reference.

BACKGROUND AND SUMMARY

The present invention is directed to a torque transmission driver used to transmit torque from a torque generating source, such as a power driver, to a fastener for assembly of a structure or device.

Torque transmission drivers for torque transmitting systems and fasteners used in those systems are well-known in the art. The bit of the driver had a recess or a projection of a particular shape which fit a complimentary shaped projection or recess in the fastener. One of the more commonly known torque transmitting systems was the cruciform type drive system commercialized as the PHILLIPS® drive system. See for example, U.S. Pat. No. 2,046,837. Numerous forms and shapes of torque transmitting drive systems have been proposed. See for example, U.S. Pat. No. 2,397,216. In addition, some prior drive systems included three blades or lobes. See for example, U.S. Pat. Nos. 4,084,478, and 8,182,187.

Spline-type torque transmitting systems of four-lobe, five-lobe and six-lobe have been well-known. Examples of these four-lobe, five-lobe and six-lobe torque transmitting systems, with their fasteners and drivers, are described in U.S. Pat. Nos. 2,969,250; 3,187,790; 3,584,667; 4,970,922 and 5,279,190. Early versions of such spline-type torque transmission drive systems had square corners, for which corresponding fastener recesses were difficult and expensive to make and resulted in stresses in the fastener and/or driver which lead to fatigue failure with repeated use. Later versions of five and six lobe spline type torque drive systems had a plurality of intersecting oppositely curved surfaces evenly positioned about the 360° circumference of the fastener head or driver bit to form an alternating series of lobes and flutes. These latter torque drive systems overcame some of the problems inherent in the earliest spline type systems, but were not generally capable of retaining a lobe drive angle less than five degrees. Upon application of higher torques, force components would rise causing failure or strip out of the lobes from the fasteners or the drivers. One version of these later spline type torque drive systems, known commercially as the TORX® drive system, had six-lobe and five-lobe configurations based on mating arcuate surfaces designed to attain drive angles within the range of 10° to 20°. See U.S. Pat. No. 3,584,667.

A later version of this spline type torque transmission drive system reduced the drive angle to zero by having both the driven surfaces of the fastener head and the drive surfaces of the torque driver formed by a first series of elliptically curved surfaces with a second series of elliptically curved surfaces alternating there between. One series of these elliptically curved surfaces was convex, while the alternating series of elliptically curved surfaces was concave. The alternating concave and convex elliptically curved surfaces merged smoothly and tangentially to define a series of alternating flutes and lobes extending about the 360° circumference of the fastener head or the driver bit. Both the lobes and the flutes of the fastener head and driver bit were elliptically curved in section. Also, the centers of the elliptically curved lobes and corresponding centers of the elliptically curved flutes were disposed at the apexes of a regular hexagon, although not the same hexagon, due to the alternating nature of these components. See U.S. Pat. No. 5,279,190. An embodiment of this lobular torque transmission drive system has been commercially marketed as the TORX PLUS® drive system.

Certain prior torque transmission drivers have been limited by their dedication to one or a limited number of sizes of fastener having drive surfaces, with recess or projections, corresponding to the size of the driver. For example, the lobular fastener marketed under the brand name TORX® required a separate driver of a diameter to match each size of corresponding fastener. This meant that a set of the drivers had to be maintained on site by assemblers, and each time a different size fastener was installed a different size bit was retrieved from the set and installed in a torsion gun. For example, a T-1 TORX® driver was required to drive a T-1 TORX® fastener, and a T-2 TORX® driver was required to drive a T-2 TORX® fastener, and so on. Other fastener systems, such as a cruciform type system sold under the brand name PHILLIPS®, could drive more than one size fastener, but these systems were susceptible to driver cam-out from the fastener. Cam-out is a rotational lifting movement by which the driver lifts out of the fastener recess, caused when the fastener and the driver have angled surfaces that enable sliding movement between the surfaces. Cam-out by the prior torque transmission systems caused damage to the fasteners and drivers, prevented fasteners from being tightened to a proper torque, as well as generated shavings and burrs that damaged components in the assembly.

The prior systems created inefficiency for assemblers who install fasteners of different sizes who have to pick up one driver to install one size fastener and pick up another driver to install another size fastener, or alternatively attempt to drive a fastener with the wrong size driver or a driver that cams out, which added to the difficulty where not impossible. Driving a fastener with a driver that was too large or too small for the fastener prevented the driver from seating properly increasing the prospect of cam-out of the driver from the fastener, strip-out or shearing of the fastener recess or projections, and/or improperly torqued fastener installation. This presented inefficiency and waste in installation and an increased incidence of mis-installed fasteners in assemblies and failure of the assemblies. Tapered drive systems in the past of the cruciform type, e.g. PHILLIPS® drivers, were well know to cam out of fasteners under torque, causing damage to and waste of fasteners or drivers, with decreased efficiency and increased incidence of mis-installed fasteners and misassembly of products, devices and machines. Additionally, the prior spline-type systems were less effective with thread forming and thread cutting fasteners because the drivers tended to cam out of the fastener and the drivers wobbled in the fasteners not maintaining axial alignment. All of these problems were accentuated in extremely small size fastener heads and torsion drivers, particularly for fasteners with a major thread diameter smaller than about 0.063 inch (1.6 millimeter), and more particularly for fasteners with a major thread diameter smaller than about 0.039 inch (1.0 millimeter). In addition to the problems discussed above, such small fasteners tended to deform when in use because of the small size of the fasteners, the sizes of the lobes, and the clearance tolerances involved.

There remains a need for fastening systems including drivers and fasteners that address the foregoing problems.

A fastener system includes a fastener having a head with a recess, and a threaded shank, the recess defined by a series of three alternating lobes and troughs about a rotational axis, each of the alternating lobes and troughs defined by in series an outer radius portion, a drive side transition, an inner transition radius, and a reverse drive portion, the recess having a side wall defined by the outer radius portion with a taper angle of about 60° from the rotational axis; and a driver comprising a shaped tapered bit defined by a series of three alternating lobes and driver troughs about the rotational axis, each of the alternating lobes and troughs defined by in series an outer radius portion, a drive side transition, an inner transition radius, and a reverse drive portion, wherein each lobe has a tapering height and width with a substantially constant ratio of lobe width to lobe height, and wherein the driver lobes have a side wall defined by the outer radius portion with a taper angle relative to the rotational axis less than or equal to the taper angle of the recess side wall.

In some embodiments, the driver side wall has a taper angle of about 60° from the rotational axis. In some embodiments, the driver side wall has a taper angle of about 42° from the rotational axis. In some embodiments, the taper angle of the driver side wall is at least 10° less than the taper angle of the recess side wall.

In some embodiments, the drive side transition is linear and defines a drive angle relative to a radial line extending from the rotational axis and tangent to the inner transition radius. In some embodiments, the drive angle is between about 0° and 5°. In some embodiments, the drive side transition has a length between about 20% and 60% of the lobe height.

In some embodiments, the inner transition radius comprises a first segment defined by a first radius and a second segment defined by a second radius greater than the first radius.

In some embodiments, the driver comprises a tip portion and the outer transition radius is tapered at about 140° in the tip portion.

In some embodiments, the fastener system further includes a plurality of additional fasteners of different sizes, each of the plurality of fasteners having at least one cross section of a recess that is substantially the same as a cross section of the recess of the fastener, wherein the driver is configured to transmit torque to each of the fasteners.

In some embodiments, the fastener has a major thread diameter smaller than 0.039 inch (1.0 millimeter). In some embodiments, the fastener has a major thread diameter smaller than 0.063 inch (1.6 millimeter).

In some embodiments, the drive side transition of the driver is adapted to engage the drive side transition of the fastener at a lift angle less than 2° to reduce cam out.

BRIEF DESCRIPTION OF THE DRAWINGS

FIG. 16A illustrates an embodiment of a driver for a three lobe fastener system;

FIG. 16B is illustrates a tip portion;

FIG. 16C is a detail view of the driver shown in FIG. 16;

FIG. 16D illustrates a three-lobe bit;

FIG. 16E is a detailed view of the tip portion shown in FIG. 16B;

DETAILED DESCRIPTION OF THE DRAWINGS

Figure 1A:
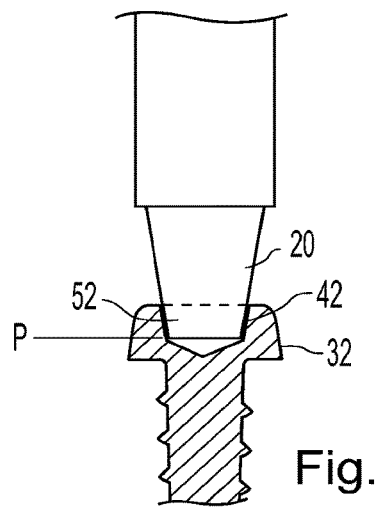
FIG. 1A-1D is a diagrammatical representation of a torque transmission driver engaging corresponding recesses of similar shape and taper in a plurality of fasteners.
Figure 1B:
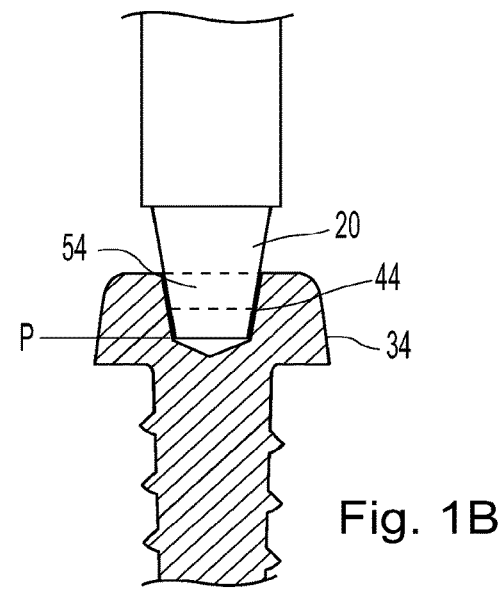
Figure 1C:
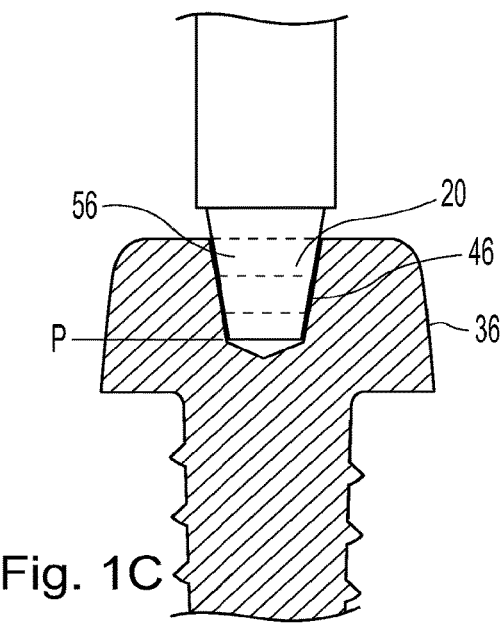
Figure 1D:
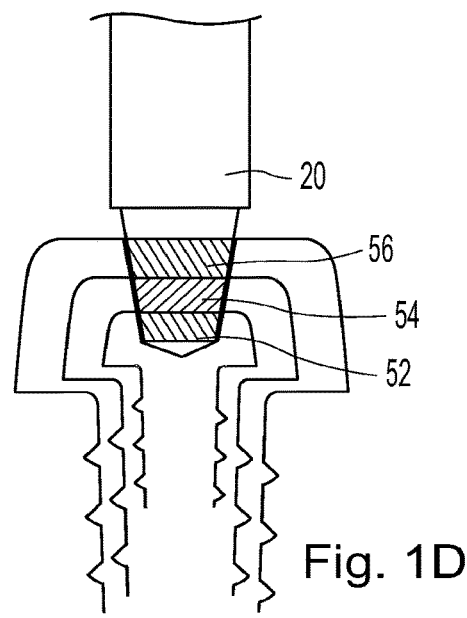

Referring now to FIGS. 1A-1D, a diagrammatical representation of a torque transmission driver 20 is shown engaging corresponding recesses of similar shape and taper in a plurality of fasteners 32, 34, 36 with differing recess sizes 42, 44, 46. The tapered drive surfaces of the bit, such as shown in FIGS. 1A-1D, may comprise a first tapered portion 52 operable to engage a first sized recess 42 in a first fastener 32, a second tapered portion 54 operable to engage a second sized recess 44 in a second fastener 34, and a third tapered portion 56 operable to engage a third sized recess 46 in a third fastener 36. As shown in FIG. 1D, in this application the third sized recess 46 of the third fastener 36 is larger than the second sized recess 44 of the second fastener 34, which is larger than the first sized recess 42 of the first fastener 32. As such, the torque transmission driver 20 is adapted to effectively drive more than one size fastener. While the torque transmission driver 20 shown in FIGS. 1A-1D is operable to effectively engage and drive three different size fastener recesses, the torque transmission driver 20 may be adapted for a desired plurality of fastener recess sizes and fastener sizes. The torque transmission driver typically may effectively engage and drive between 2 and 4 different fastener drive surfaces, such as recesses or projections, as discussed below.

Figures 2, 3, 4, 5:
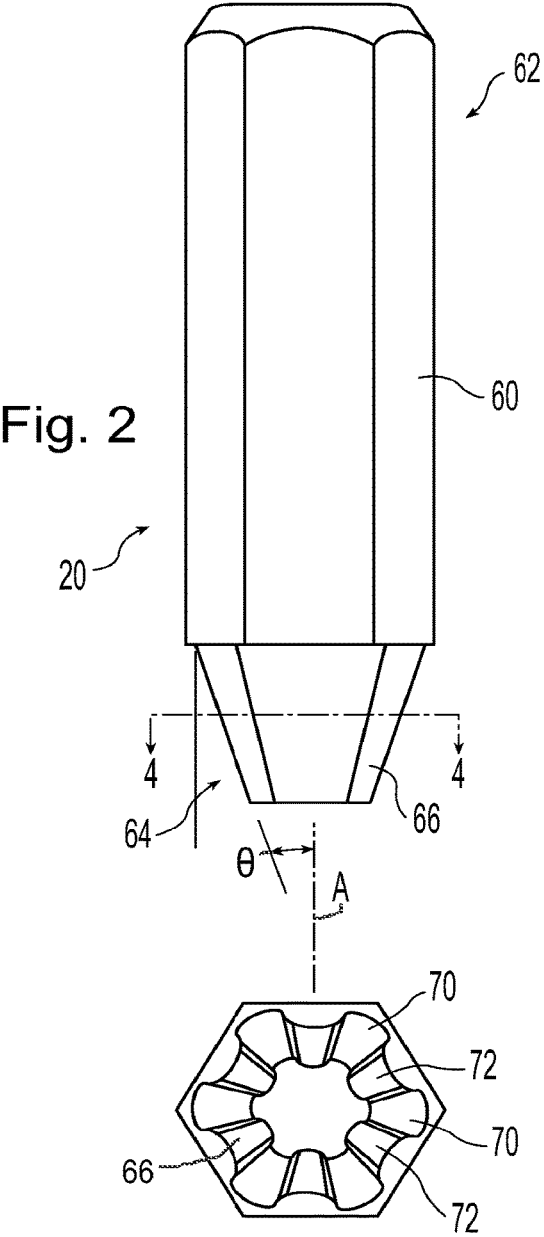
FIG. 2 is a side view of the torque transmission driver.
FIG. 3 is an end view of the torque transmission driver of FIG. 2.
FIG. 4 is a cross-sectional view through the torque transmission driver of FIG. 2 from the section line 4-4.
FIG. 5 is a detail view taken from the cross-sectional view of FIG. 4.

The torque transmission driver 20 as shown in FIG. 2 includes a main body 60 having a first end portion 62 and a second end portion 64. The first end portion 62 is adapted to receive and transmit torque from a torque generation source, such as a power driver, a manually operated driver handle, a drill motor, or other torque generation source as desired. As shown in FIGS. 2 and 3, the second end portion 64 is opposite the first end portion 62 and includes a shaped tapered bit 66 having a series of six lobes 70 and troughs 72 about a rotational axis, shown as A in FIG. 2. The six lobes 70 and troughs 72 are symmetrically arranged about the rotational axis having a taper angle θ between 15° and 65° from the rotational axis as shown in FIG. 2. In one application, the taper angle θ is about 35°. Alternatively, the taper angle is about 40°. In yet another application, the taper angle is a selected angle between 25° and 40°. In yet another application, the taper angle is a selected angle between 45° and 65°. In yet other applications, the taper angle is a selected angle between 45° and 55°, between 50° and 55°, or between 55° and 65°. In yet other applications, the taper angle is approximately 45° or approximately 52°. An increased taper angle may provide greater strength to the recess reducing wear and failure of the fasteners and driver.

Figure 12:
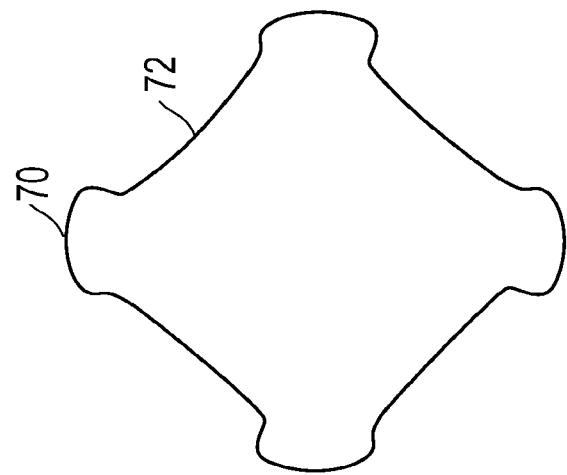
FIG. 12 is another alternative cross-sectional view through the section line 4-4 of FIG. 2.
Figure 11:
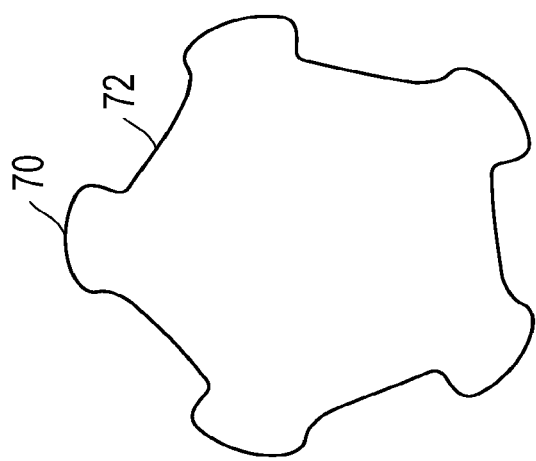
FIG. 11 is an alternative cross-sectional view through the section line 4-4 of FIG. 2.

The torque transmission driver 20 as shown in FIGS. 3 and 4 is a six-lobe driver. In one alternative, the torque transmission driver 20 and corresponding fasteners may include a five-lobe torque transmission system shown by example of the cross-section in FIG. 11, or may be a four-lobe torque transmission system shown by example of the cross-section in FIG. 12. In one application, a small fastener having a major thread diameter less than about 0.039 inch (1.0 millimeter) may utilize a four-lobe torque transmission system. Alternatively, a small fastener having a major thread diameter less than about 0.063 inch (1.6 millimeter) may utilize a four-lobe torque transmission system. In another application, a small fastener having a major thread diameter less than about 0.039 inch (1.0 millimeter) may utilize a five-lobe torque transmission system. In yet another alternative, a small fastener having a major thread diameter less than about 0.063 inch (1.6 millimeter) may utilize a five-lobe torque transmission system.

At any cross section through the tapered bit 66, such as the cross-section shown in FIG. 4, the outermost tip of each lobe 70 forms a lobe outer diameter 74, and the root of each trough 72 forms an inner diameter 76. The difference between the radius of the lobe outer diameter 74 and the radius of the inner diameter 76 is the lobe height 78. Additionally, each lobe has a width 80. As the bit 66 tapers toward the second end, each lobe has a tapering height and width. For each tapering lobe, the ratio of the lobe width to height is substantially the same for each lobe as it tapers along the axis.

The main body 60 may be a hexagonal shank having a length and cross-sectional size operable to be mounted in or otherwise engage the torque generation source such as a power driver. For example, in a common application, the main body may have a 5/16 inch hexagonal cross-section. Alternatively, the main body may have a 1/4 hexagonal cross-section. The main body 60 may have any cross-sectional shape and size as desired corresponding to the torque generation source needed for the application. Alternatively, the main body may include a socket (not shown) for receiving a corresponding engagement on the torque generation source.

Figure 6:
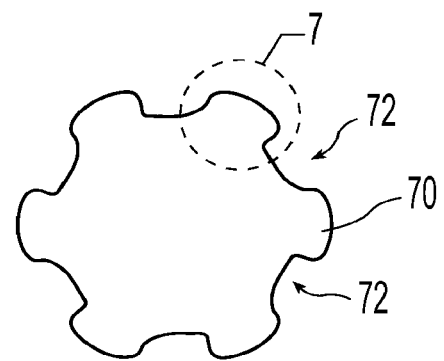
FIG. 6 is an alternative cross-sectional view through the torque transmission driver of FIG. 2 from the section line 4-4.
Figure 7:
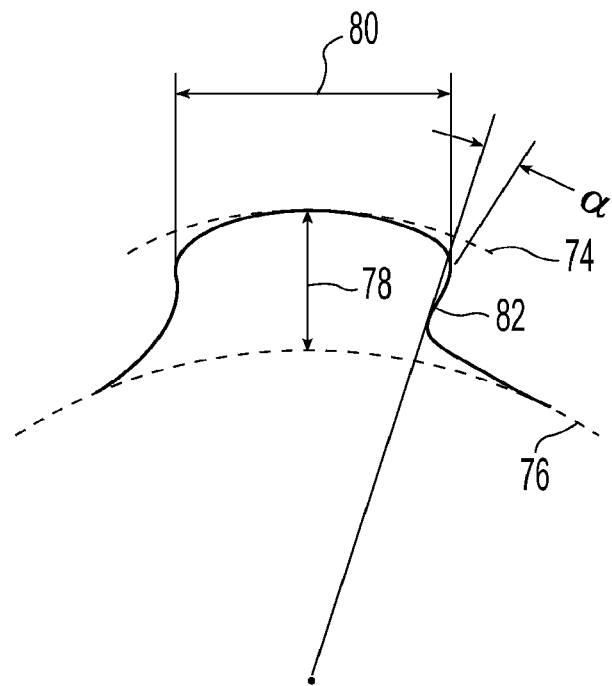
FIG. 7 is a detail view taken from the cross-sectional view of FIG. 6.

In the example of FIGS. 3-5, the transition between each lobe 70 and the trough 72 on at least one side of each lobe 70 forms a drive side transition 82 extending between an outer transition radius 94 and an inner transition radius 96. A drive angle α is measured between the drive side transition 82 and a radial line 98 extending from the rotational axis A and tangent to the inner transition radius 96 as shown in FIG. 5. The drive side transition 82 is adapted to engage a corresponding fastener surface for transferring torque from the driver to the fastener. The drive side transition is typically between about 20% and 60% of the lobe height. Alternatively, the drive side transition is between about 10% and 80% of the lobe height. In yet another alternative, the drive side transition is between about 20% and 40% of the lobe height. As shown in FIG. 5, the drive side transition 82 forms a drive angle α between 0° and 5°. Alternatively, as shown in FIGS. 6 and 7, the transition between each lobe and the trough on at least one side of each lobe 70 form the drive side transition 82 having a negative drive angle, where the drive angle α is between 0° and −10°. In one application, the drive angle α is between −2° and −10°. Alternatively, the drive angle α is between −3° and −10°. In yet another alternative, the drive side transition may form a drive angle between 0° and −3°. As used herein, a positive drive angle is defined as a drive side transition surface angled outwardly such that a line extending perpendicularly from the surface is directed toward the outside of or away from the inner diameter 76. Conversely, a negative drive angle is defined as a drive side transition surface angled inwardly such that a line extending perpendicularly from the surface is directed toward the inside of or toward the inner diameter 76. A zero degree drive angle provides a line perpendicular to the drive side transition surface that is parallel to a tangent of the inner and/or outer lobe diameters. Typically, the fastener drive angle is approximately the same as the bit drive angle to provide surface to surface contact. Alternatively, the fastener drive angle may be greater or less than the bit drive angle to accommodate clearances between the fastener and the driver as desired.

Figure 8:
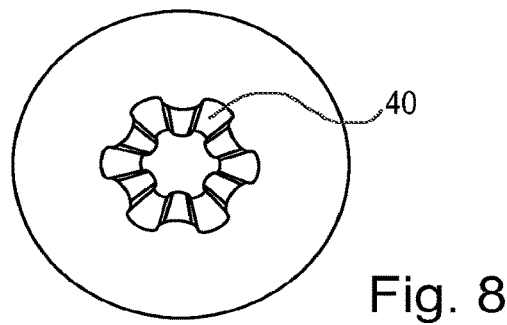
FIG. 8 is a top view of the head of a fastener.

The tapered driver 20 is operable to drive corresponding drive surfaces in a fastener in a male-female engagement. In one application as discussed above and shown in FIGS. 8-10, the fastener 36 has a drive end portion 86 and a lead end portion 88. The drive end portion 86 is operable to engage a torque transmission driver and the lead portion 88 is operable to fasten the fastener, such as by threads. The drive end portion 86 has drive surfaces 40 comprising a series of five or six fastener lobes 90 and fastener troughs 92 about a rotational axis having tapered drive surfaces γ of between 15° and 65° from the rotational axis. The fastener lobes 90 and fastener troughs 92 are operable to engage corresponding drive surfaces of similar shape and taper on the driver. Each fastener lobe 90 has a tapering height and width, where the ratio of lobe width to height is a constant. In the fastener recess, the lobes 90 project into the recess to engage the driver troughs 72 on the driver. Similarly, the driver lobes 70 on the driver engage the fastener troughs 92 in the fastener recess.

Figure 9:
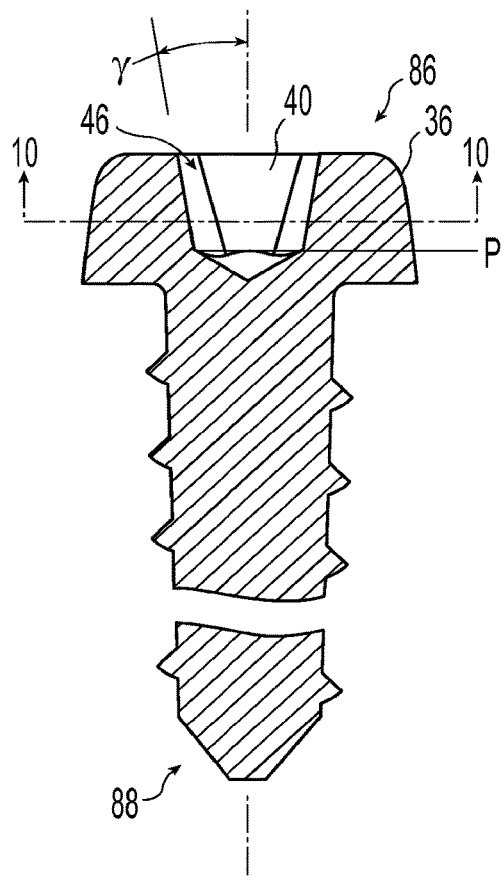
FIG. 9 is a partial cross-sectional view through the fastener of FIG. 8.
Figure 10:
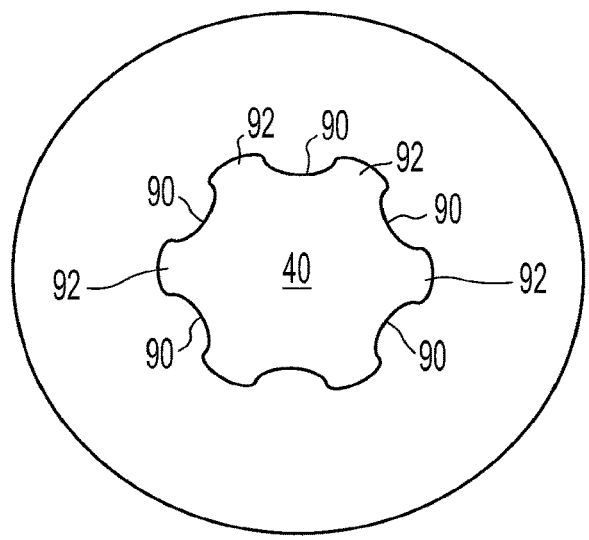
FIG. 10 is a cross-sectional view through the fastener of FIG. 9 from the section line 10-10.
Figure 13:
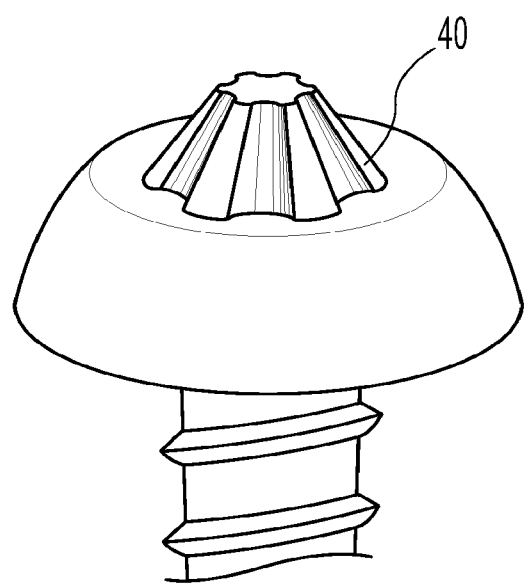
FIG. 13 is a perspective view of an alternative fastener of the present disclosure.

In another alternative, such as shown in FIG. 13, the fastener drive surfaces 40 comprise a projection of four, five, or six lobes and troughs to engage a corresponding recess in the driver (not shown). It is intended that discussion and references in the present application describing drive surfaces of the driver bit corresponding to a recess in the fastener such as shown in FIG. 9 also apply to drive surfaces as a projection on the fastener such as shown in FIG. 13. Similarly, discussion and references in the present application describing drive surfaces of the recess in the fastener such as shown in FIG. 9 also apply to drive surfaces in a recess in a driver for use in driving projections on a fastener such as shown in FIG. 13.

The lobes and troughs taper into the recess at least to a bottom plane, identified in FIG. 9 as "P". The bottom plane P as used herein is the approximate depth to which a corresponding driver is insertable into the recess. Below the bottom plane P, the bottom of the recess may be conical, hemispherical, hemispheroidal, flat, or any other arcuate or angled shape as desired for forming the recess. From the bottom plane P, the cross-sectional lobular shape of the recess tapers outwardly toward the top of the fastener recess having a taper angle γ. The recess taper angle γ may be approximately the same as the driver taper angle θ. Alternatively, the recess taper angle γ may be slightly larger than the driver taper angle θ for manufacturing tolerances. In another alternative, the recess taper angle γ may be between 0.5° and 5° larger than the driver taper angle θ. As one example, the recess taper angle γ may be specified between 35° and 36°, and the driver taper angle θ specified between 34° and 35°, where nominally the recess taper angle γ and the driver taper angle θ are 35°. In another example, the recess taper angle γ may be specified between 52° and 53°, and the driver taper angle θ specified between 51° and 52°, where nominally the recess taper angle γ and the driver taper angle θ are each 52°. In another example, the recess taper angle γ may be specified between 45° and 46°, and the driver taper angle θ specified between 44° and 45°, where nominally the recess taper angle γ and the driver taper angle θ are 45°. However, the recess taper angle γ and the driver taper angle θ may be any angle between 15° and 65° from the rotational axis as desired.

A fastening system may be provided whereby one torque transmission driver 20 is operable to drive a plurality of different sized fasteners 32, 34, 36. The tapered driver 20 may be configured to drive two or more different sized fasteners with the same size of bit 66. In the example of FIG. 1A-1D, the tip portion of the tapered bit has a cross-sectional size forming the first tapered portion 52 operable to engage fasteners corresponding to the size of the first tapered portion. The second tapered portion 54 may be adjacent the first tapered portion 52 in a position on the tapered bit having a cross-sectional size larger than the first tapered portion. The second tapered portion 54 is operable to engage fasteners corresponding to the size of the second tapered portion. Similarly, a third tapered portion 56 is adjacent the second tapered portion 54 operable to engage fasteners corresponding to the size of the third tapered portion. For example, one driver may be adapted to drive associated sizes 6, 8 and 10 screws, in which the first tapered portion 52 of the bit is adapted to the #6 screw, the second tapered portion 54 is adapted to the #8 screw, and the third tapered portion 56 is adapted to the #10 screw. In other alternatives, one driver may be adapted to drive associated sizes 8, 10 and 12 screws, and another driver adapted to drive associated ¼ inch, 5/16 inch, and ⅜ inch screws. Alternatively, a driver may be adapted to drive a plurality of small fasteners, such as size #0 and #1 fasteners, or smaller, associated to the driver. The driver may be adapted to drive two or more sequentially-sized associated fasteners as desired.

For one driver 20 to drive a plurality of fasteners 32, 34, 36 of differing sizes, each fastener has drive surfaces 40 corresponding to the driver such that the differing sizes of drive surfaces have at least one cross-section substantially the same in size and shape. Specifically, with reference to FIGS. 1A-1D, the size and shape of the cross-section of the recesses 42, 44, 46 at the bottom plane P is the approximately the same for each fastener associated with the desired drive bit 20. Additionally, the corresponding cross-sectional size and shape of the driver 20 at the second end 64 is approximately the same as the fastener size and shape at the bottom plane P. For certain applications, the cross-sectional size and shape of the driver 20 at the second end 64 is smaller than the fastener size and shape at the bottom plane P for ease of insertion of the driver into, and removal from, the recess. Alternatively, the cross-sectional size and shape of the driver 20 at the second end 64 is slightly larger than the fastener size and shape at the bottom plane P such that interference between the driver and fastener cause the fastener to releasably stick to the driver so that an assembler does not have to hold the fastener onto the driver.

The drive surfaces of the fastener and the correspondingly configured bit drive surfaces are configured for the fastener drive surfaces to engage the corresponding bit drive surfaces an engagement depth sufficient to permit good application of torque from the driver bit to the fastener. For example, a small fastener having a major thread diameter less than about 0.039 inch (1.0 millimeter) may have an effective engagement depth of the drive surfaces of less than 0.010 inch (0.25 millimeter). For larger fasteners, such as having a major thread diameter greater than about 0.236 inch (6.0 millimeter), the effective engagement depth may be 0.06 inch (1.5 millimeter), or greater.

For certain larger fastener applications, the tapered fastener drive surfaces and associated driver may be manufactured using traditional cold-heading and/or machining techniques. However, smaller fasteners tend to require increased precision. In one application the fastener drive surfaces are impressed or embossed onto the fastener by stamping. For certain applications, such as for small fasteners having a major thread diameter less than about 0.039 inch (1.0 millimeter), or alternatively having a major thread diameter less than about 0.063 inch (1.6 millimeter), the drivers may be made by electrical discharge machining (EDM) or electrochemical machining (ECM). It is contemplated that hobbing may also be used for certain suitable geometries.

The present torque transmission drivers may be steel or aluminum as desired for the application. In one alternative, the steel is a medium carbon steel, such as AISI S2, 6150, 8650, 8660, or other tool steel compositions or alloy steel compositions as desired for hardenability and strength. The medium carbon steel may be hardened after the driver is made. After the torque transmission driver is formed, the steel driver may be hardened to a hardness of 58-62 HRC. Alternatively, the steel driver may be hardened to a hardness greater than 52 HRC.

Figure 14A:
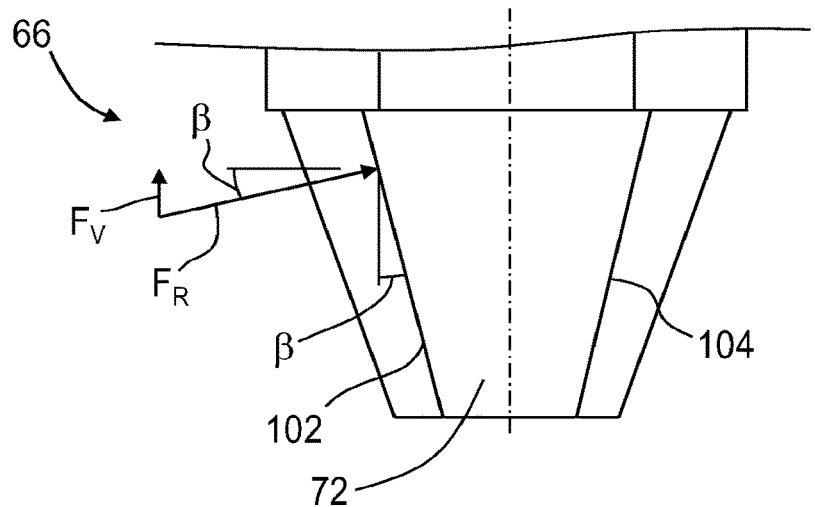
FIG. 14A is a detail view of the torque transmission driver of FIG. 2.

As discussed above, the lobes 70 of the driver shown, for example, in FIG. 3, taper as the bit 66 is tapered. In these embodiments, when the size of the cross sectional bit (see FIGS. 2-4) is reduced, the proportions of the lobes 70 to troughs 72 will remain substantially the same. Because the lobes are tapered, the reaction force exerted against the driver lobe from the fastener, schematically represented as "$F_R$" in FIG. 14A, includes a lift angle β. The reaction force $F_R$ includes a component along the driver axis, schematically represented as "$F_V$" in FIG. 14A, in a direction tending to lift the driver 20 and reduce driver engagement in the fastener recess during driving of the fastener. This process is known as "cam out" because as driving torque increases and the component force $F_V$ increases, when a force opposing the component force $F_V$ is not applied the driver may lift in a direction away from the fastener recess, and in some instances the driver may lift enough to disengage from the fastener recess.

Figure 14B:
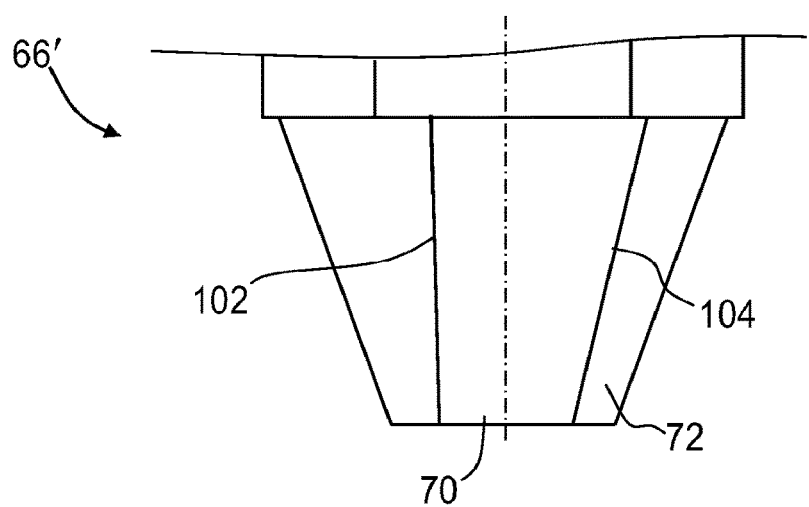
FIG. 14B is a detail view of an alternative torque transmission driver of the present disclosure.

The presently disclosed fastener system inhibits cam out, and for certain applications it may be desired to further reduce the forces causing cam out. In one example shown in FIG. 14B, the drive surface 102 of the driver 66' may be modified while the trailing surface 104 may be tapered as previously explained. The drive surface 102 may be substantially parallel to the axis of rotation of the driver, as shown in FIG. 14B, reducing the lift angle β to be at or near zero degrees, depending on manufacturing tolerances. In one alternative, the lift angle on the drive surface 102 may be between 0° and 2°. The lift angle may be selected to reduce the amount of vertical force imposed on the driver when a torque is applied to the fastener through the driver. As torque requirements increase, it may be desirable for the lift angle to be at or near zero degrees. In low-torque arrangements, the lift angle may not need to be highly constrained, as determined by the application. In the arrangement shown in FIG. 14B having the angle of the drive side approximately zero degrees, the lift angle β will be near zero when the driver is used to tighten a fastener with a corresponding recess, reducing the potential for cam-out during fastening. When the driver shown in FIG. 14B is used to loosen a fastener, the lift angle on the trailing surface 104, which drives the removal of the fastener, may be greater than zero. The fastener may be designed to accommodate separate drivers for installation and removal of fasteners, which may be desired for tamper-resistant applications.

The driver 66' shown in FIG. 14B enables less taper on the corresponding drive side of the lobes in the fastener recess, which increases the amount of material in the lobes of the fasteners making the fastener stronger. The added material in the fastener lobes may cause the difference in the torque between the driver and the fastener to be closer in amounts, further assisting in inhibiting cam-out and improving service of the driver.

Figure 15:
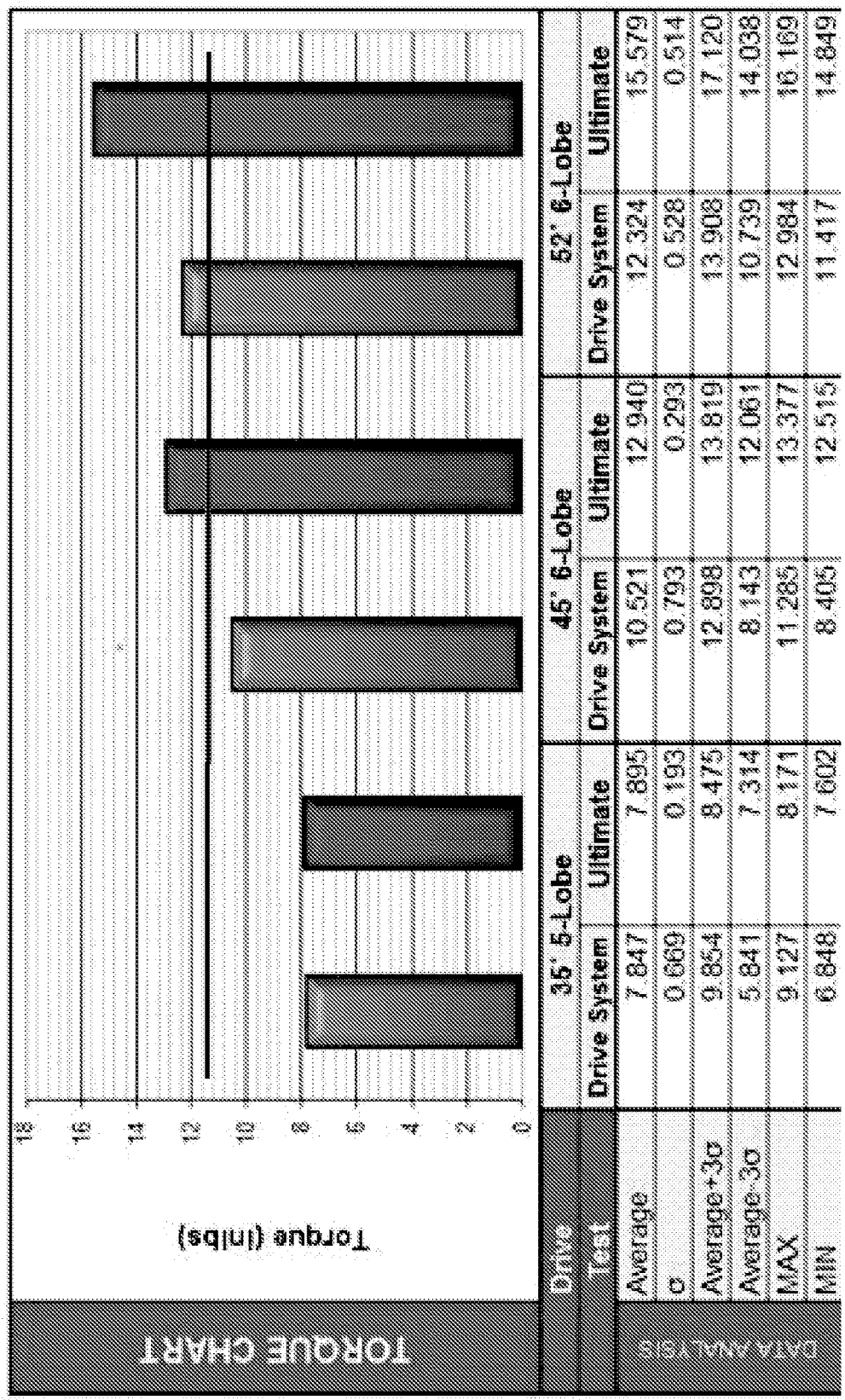
FIG. 15 is a chart of test data for selected embodiments of a tapered lobular driver and fastener system.
Figure 17B:
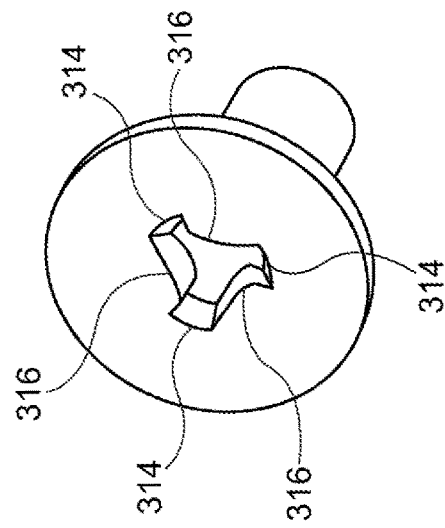
FIG. 17B illustrates an embodiment of a fastener for a three-lobe fastener system.
Figure 17D:
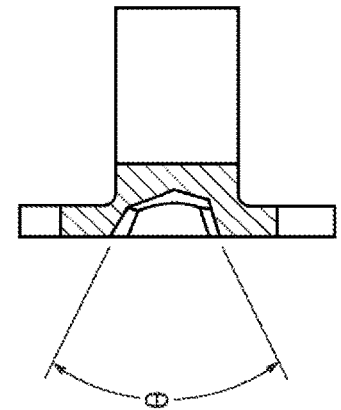
FIG. 17D is side-view of a fastener for a three-lobe fastener system.
Figure 17A:
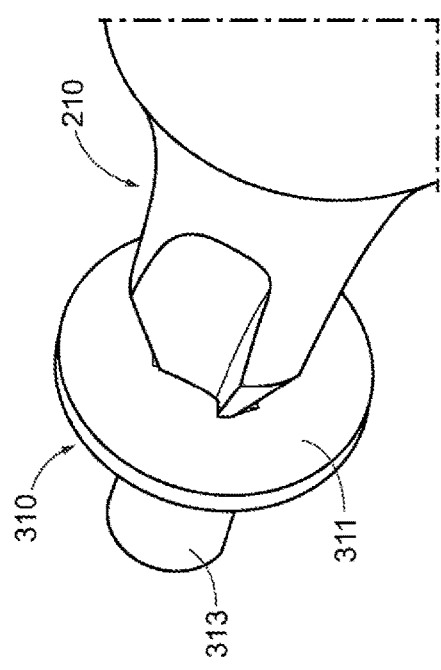
FIG. 17A illustrates an embodiment of a fastener for a three lobe fastener system.
Figure 17C:
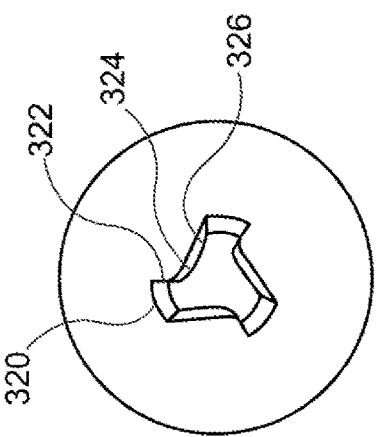
FIG. 17C is a detail view of a fastener for a three-lobe fastener system.

Referring now to FIG. 15, tests were conducted of the disclosed tapered lobular driver and fastener system. In each instance, a set of tapered lobular drive bits having a selected taper angle were engaged corresponding recesses. As shown in FIG. 15, the three tests included a five-lobe drive bit and recess having a taper angle of 35°, a six-lobe drive system having a taper angle of 45°, and a six-lobe drive system having a taper angle of 52°. The drive bits were each torque until the drive system failed to identify the strength of the system. In addition, the drive bits were tested in both a standard fastener recess, as well as a recess formed in high speed steel having significantly increased strength in order to separately analyze the strength of the drive bit. The black reference line indicates the specified drive bit strength of a prior art commercially available six-lobe straight-walled drive bit. As shown, the six-lobe drive bits having taper angles of 45° and 52° both exceeded the drive bit strength of the six-lobe straight-walled drive bit. The tapered lobular driver and fastener thus provide an improvement in drive system strength in combination with the ability to use a single driver with multiple size fasteners, all while reducing the potential for cam-out during fastening.

Three Lobe Embodiment

Referring now to FIGS. 16-18 also disclosed is a fastener system that includes a fastener and a driver having a three lobe drive surface configuration.

Referring to FIGS. 16A-16E, an embodiment of a driver 210 is show in multiple views. The driver 210 includes a shaped tapered bit 212 defined by a series of three alternating lobes 214 and troughs 216 about the rotational axis. Each of the alternating lobes 214 and troughs 216 are defined by an outer radius portion 220, a drive side transition 222, an inner transition radius 224, and a reverse drive portion 226, as best shown in the cross section illustration. Each lobe 214 has a tapering height and width with a substantially constant ratio of lobe width to lobe height. Lobe height and width are measured in the same manner described above with respect to FIGS. 5 and 7. The outer radius portion 220 defines the outer diameter of the bit at a given location, and further defines the side wall 230 of the driver. The side wall 230 of the driver is tapered at a taper angle θ with respect to the rotational axis of the driver. The taper angle θ of the side wall of the driver is less than or equal to the taper angle of the side wall of the recess (as discussed further below).

Referring to FIGS. 17A-17D, an embodiment of a fastener 310 is illustrated for use in the disclosed fastener system. The fastener 310 includes a head 311 with a recess 312, and a shank 313. The shank 313 may be threaded. The recess 312 is defined by a series of three alternating lobes 314 and troughs 316 about the rotational axis of the fastener. Each of the alternating lobes and troughs is defined by an outer radius portion 320, a drive side transition 322, an inner transition radius 324, and a reverse drive portion 326. Similar to the driver discussed above, the outer radius portion 320 defines the outer diameter of the recess at a given location, and further defines the side wall 330 of the recess. The side wall 330 of the recess is tapered at a taper angle θ with respect to the rotational axis of the fastener. In some embodiments, the taper angle of the recess side wall is about 60°.

Figure 18C:
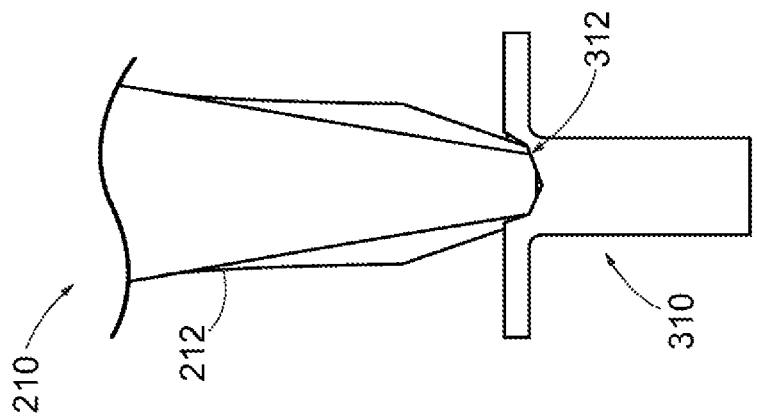
FIG. 18C illustrates an embodiment of a three lobe fastener system with off-axis drive capability.
Figure 18B:
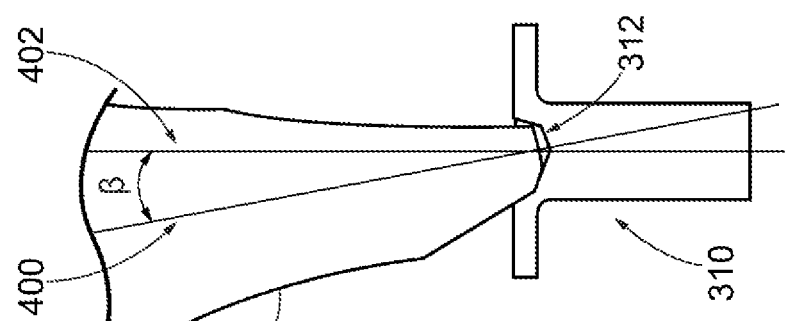
FIG. 18B illustrates an embodiment of a three lobe fastener system with off-axis drive capability.
Figure 18A:
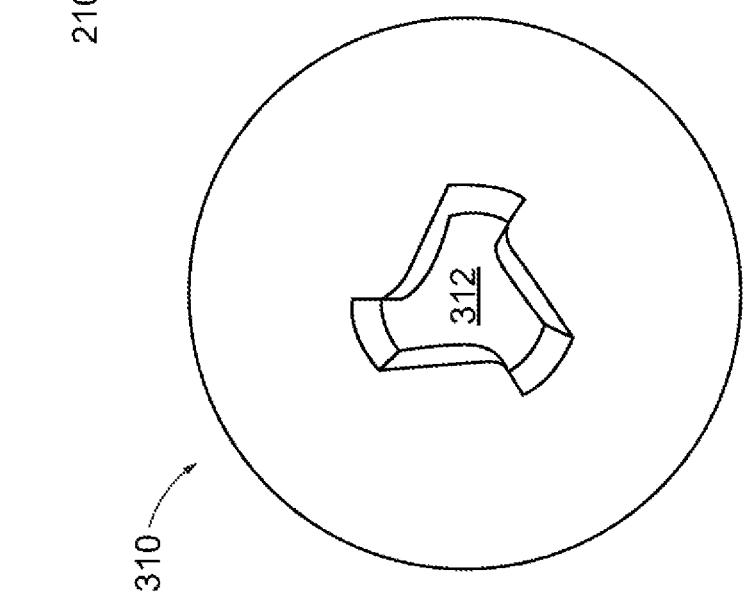
FIG. 18A illustrates an embodiment of a three lobe fastener system with off-axis drive capability.

Referring now to FIGS. 18A-18C, the driver 210 and fastener 310 combine to form a fastener system. In some embodiments, the three lobe fastener system provides advantages for off-axis drive capability. As used herein, off-axis drive capability means the ability to transmit torque from the driver to the fastener when the rotational axis of the driver is not aligned with the rotational axis of the fastener. In some embodiments, the disclosed fastener system is capable of driving fasteners with up to a 20° different the rotational axis of the fastener and the driver.

In some embodiments, the driver side wall 230 has a taper angle θ that is approximately equal to the taper angle of the recess side wall 330. In one embodiment, the driver side wall 230 taper angle θ is about 60°. In this embodiment, the three lobe configuration of the driver and fastener recess may allow for some off-axis drive capability.

In other embodiments, the driver side wall has a taper angle less than the taper angle of the recess side wall. For example, the driver side wall taper angle maybe at least 10° less than the recess side wall taper. In the embodiment shown in FIGS. 16A-16E and 18A-C, the driver side wall has a taper angle of about 42°. When the driver side wall taper angle is less than the recess side wall taper angle, the driver bit may lean within the recess with the result that the driver's rotational axis 400 deviates from the fastener's rotational axis 402. The angle β between the driver's rotational axis 400 and the fastener's rotational axis 402 indicates the extent to which the driver is "off-axis" relative to the fastener. In some embodiments, the disclosed fastener system is capable of transmitting torque to a fastener with the driver's rotational axis up to 20° off from the fastener's rotational axis. This feature facilitates use of the disclosed fastener system in products where the configuration of a product does not permit on-axis access to the recess of the fastener.

Referring again to FIGS. 16A through 17D, the drive side transitions 222, 322 may be linear and define a drive angle α. The drive angle α is defined as the angle between the drive side transition 222 and a radial line extending from the rotational axis and tangent to the inner transition radius 224, 324. In various embodiments, the driver angle α may be between 0° and 5°. The drive side transitions 222, 322 may also have a length, which may be between 20% and 60% of the lobe height. In yet other embodiments, the drive side transition 222 of the driver 210 is adapted to engage the drive side transition 322 of the fastener 310 at a lift angle less than 2° to reduce cam out.

The outer radius portion 220, 320 is defined by one or more radii which may be constant or varying. The inner transition radius 224, 324 is also defined by one or more radii which may be constant or varying. In one embodiment, the inner transition radius comprises a first segment defined by a first radius, and a second segment defined by a second radius larger than the first radius. The reverse drive portion 226, 326 extends from the inner transition radius 224, 324 to the outer radius portion 220, 320, and is configured to permit rotation of a fastener for removal.

The driver 210 also has a tip portion 240 at the end of the bit 212. In some embodiments, the tip portion 240 includes the three lobe drive surface configuration, however the outer transition radius 220 is tapered at a greater taper angle than in the bit 212. In one embodiment, the outer transition radius 220 is tapered at about 140° in the tip portion 240. The increased taper of the outer transition radius in the tip portion may improve engagement of the driver in the recess of a fastener, particularly for small fasteners where alignment of the driver and faster recess is can be difficult.

As previously discussed, the fastener system allows one driver to be used with multiple fasteners of different sizes. The multiple fasteners may each have a recess defined by the three lobe configuration and have substantially the same side wall taper angle, such that at least one cross section of the recess of each fastener is substantially the same as one cross section of the recess of the other fasteners. In this manner, a single driver may be used to drive two or more different size fasteners further improving the efficiency of the fastening system. The three lobe fastening system may be particularly beneficial for small fasteners, such as those with a major thread diameter of less than 0.063 inch (1.6 millimeter), or less than 0.039 inch (1.0 millimeter).

Referring now to FIGS. 19-22, embodiments of a driver for a three lobe fastener system are illustrated. The fastener system also includes one or more fasteners (not shown), each having a recess configured to match the configuration of the driver. For clarity, each driver is shown with a flat tip portion. Some embodiment of the drivers may include a tapered tip portion as previously discussed.

Figure 19:
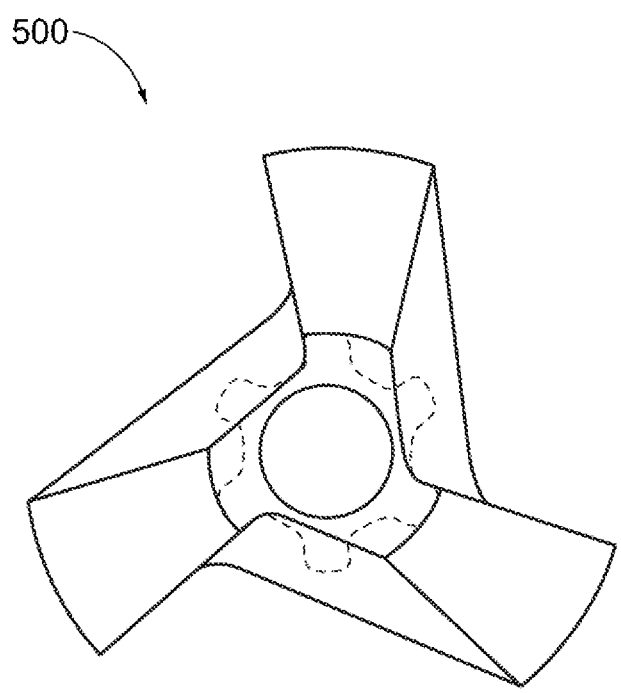
FIG. 19 is an end view of another embodiment of a driver for a three lobe fastener system.

Referring now to FIG. 19, a driver 500 is illustrated that is similar to the driver shown in FIGS. 16A-18C. The driver 500 has three alternating lobes and troughs. For comparison, the driver 500 is shown overlaid with the six lobe configuration of the driver illustrated in FIGS. 2-3. In this embodiment, the drive side transition of the three lobe driver aligns with the drive side transition of the six lobe configuration. The outer radius portion and reverse drive portion prevent use of the three lobe driver in a six lobe configured fastener.

Figure 20:
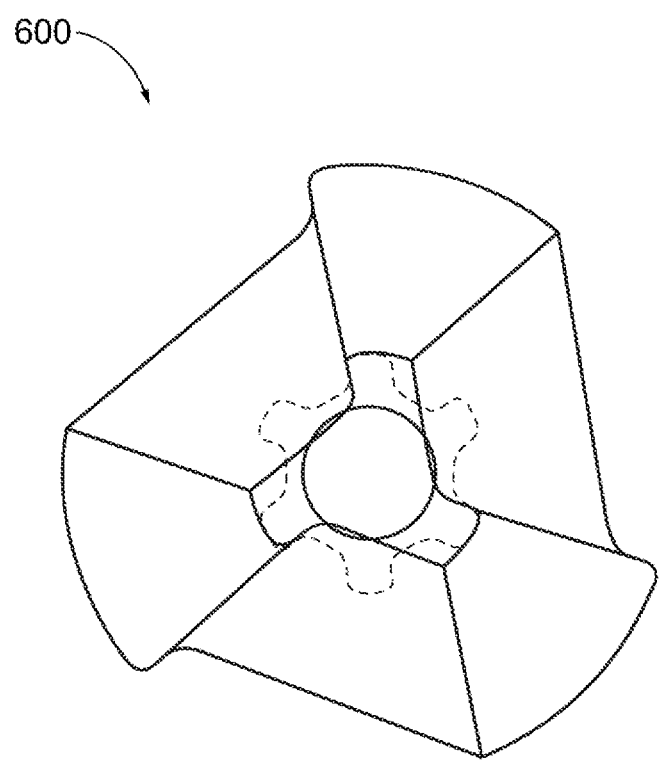
FIG. 20 is an end view of another embodiment of a driver for a three lobe fastener system.

Referring now to FIG. 20, a driver 600 is illustrated in which the width of the each lobe increases at a greater angle moving up the length of the driver. The increased lobe width may provide additional strength to the drive bit. In some embodiments, the angle at which the width of the lobes increases may be related to the taper angle of the driver side wall. In one example, a driver may have a reduced side wall taper angle and include a larger angle for increasing the width of the lobe. In this manner, the driver may accommodate a selection of shallow recess fasteners.

Figure 21:
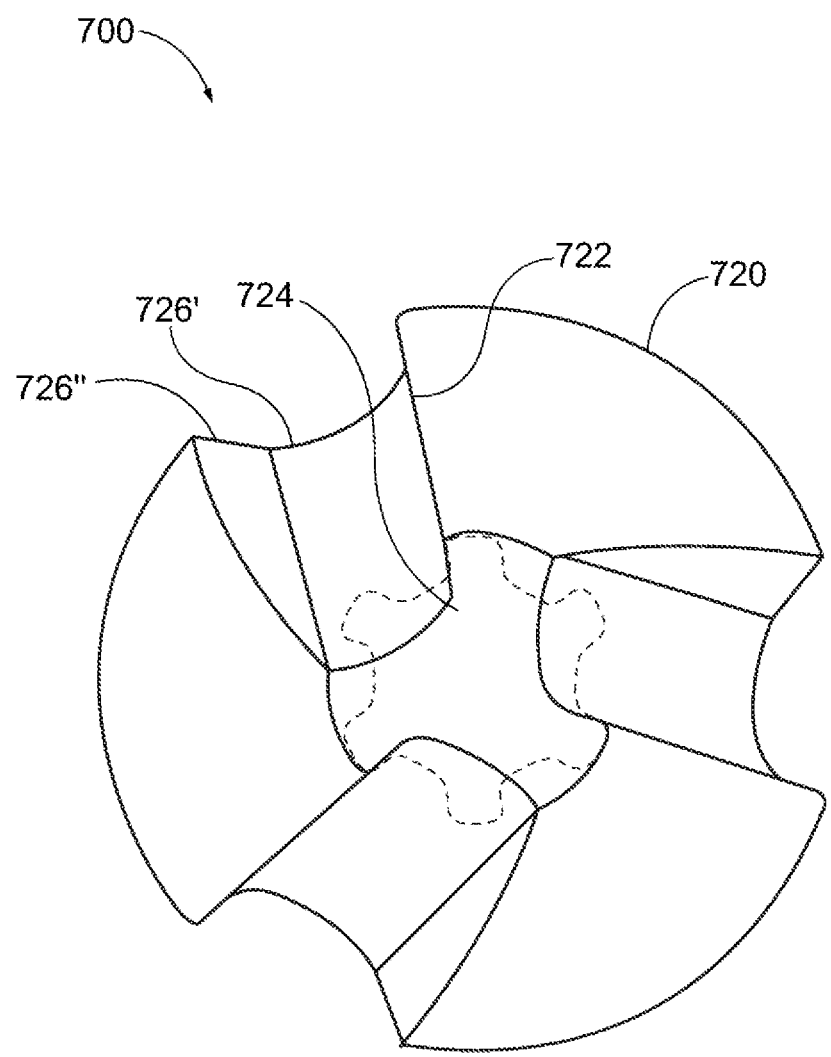
FIG. 21 is an end view of another embodiment of a driver for a three lobe fastener system.

Referring now to FIG. 21, yet another embodiment of a driver 700 for a three lobe fastener system is disclosed. The driver 700 includes three alternating lobes and troughs defined by an outer radius portion 720, drive side transition 722, and inner transition radius 724, and reverse drive portion, generally as described above. The reverse drive portion is defined by a concave portion 726' and a catch portion 726". The concave portion 726' is a curved portion defined by a constant or varying radius originating from an origin outside the outer diameter of the driver. The catch portion 726" extends generally radially. In one embodiment, the catch portion 726" defines a reverse drive angle of approximately 45°. The reverse drive portion of the driver 700 may provide an improved ability to remove fasteners, which may be beneficial for applications where removal of fasteners is contemplated. The fastener system also includes one or more fasteners (not shown), each having a recess configured to match the configuration of the driver 700.

Figure 22:
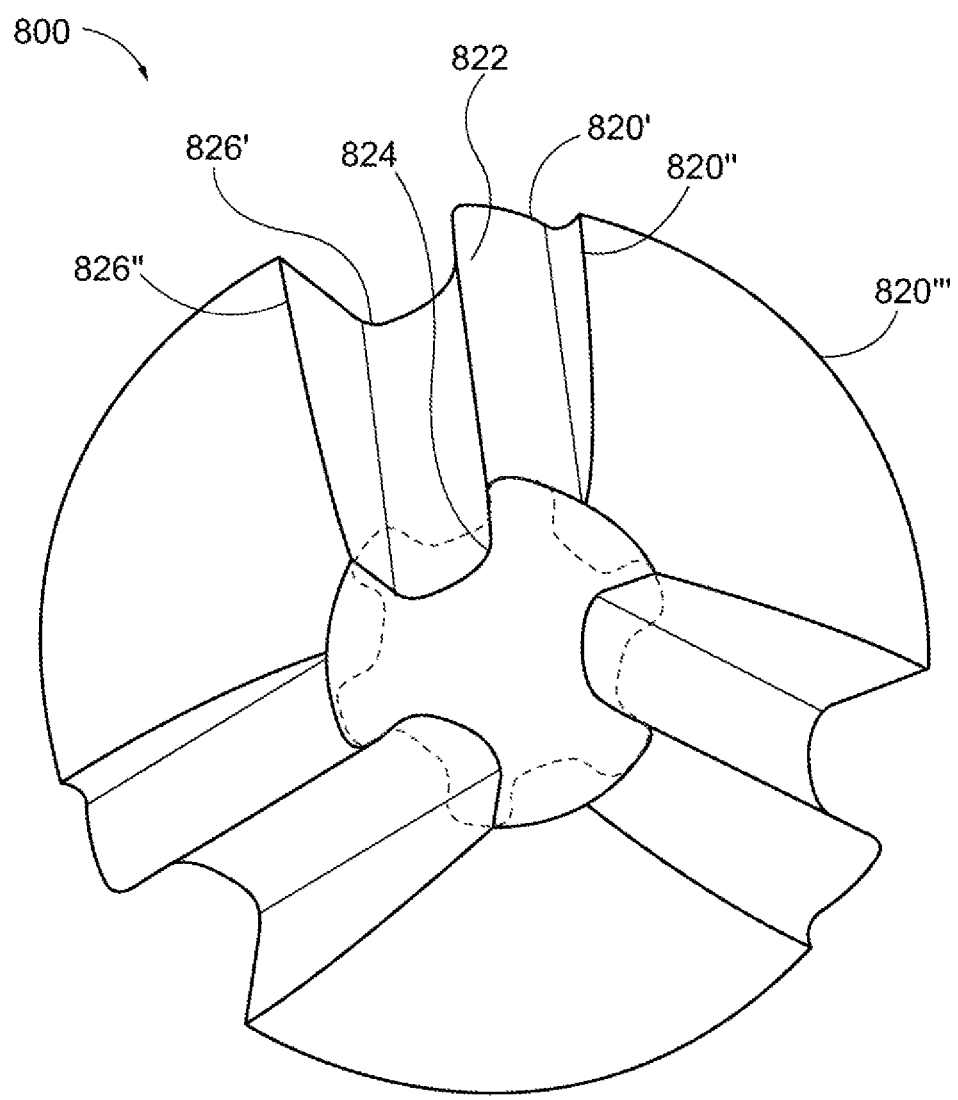
FIG. 22 is an end view of another embodiment of a driver for a three lobe fastener system.

Referring now to FIG. 22, yet another embodiment of a driver 800 for a three lobe fastener system is disclosed. The driver 800 includes three alternating lobes and troughs defined by an outer radius portion, drive side transition 822 inner transition radius 824 and reverse drive portion, generally as described above. The reverse drive portion of the driver 800 may include a concave portion 826' and a catch portion 826" similar to the configuration of the driver 700. The outer radius portion of the driver 800 may include two or more segments configured to improve the function of the fastener system. For example, the configuration may improve the forward drive capability, reverse drive capability, off-axis drive capability, seating or engagement of the driver in the fastener recess, or similar functions of the fastener system. In one embodiment, the outer radius portion of the driver 800 includes a first convex segment 820', a concave segment 820", and a second convex segment 820'''. At least a portion of the outer transition radius defines the side wall of the driver 800, and tapers at a taper angle as discussed above.

The drives and fasteners disclosed herein may be used in combination to form a fastening system so long as the configuration of the driver bit and the fastener recess are compatible for insertion and removal of the driver, and for applying torque to the fastener. In one example, a fastener corresponding to the driver 800 shown in FIG. 21, may be installed with the driver 500 shown in FIG. 19. Other combinations of fasteners and drivers are also contemplated based on the compatibility of the configurations.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A fastener system comprising:
   a fastener having a head with a recess, and a threaded shank, the recess defined by a series of three alternating lobes and troughs about a rotational axis, each of the alternating lobes and troughs defined by in series an outer radius portion, a drive side transition, an inner transition radius, and a reverse drive portion, the recess having a side wall defined by the outer radius portion with a taper angle of about 60° from the rotational axis; and a driver comprising a shaped tapered bit defined by a series of three alternating lobes and driver troughs about the rotational axis, each of the alternating lobes and troughs defined by in series an outer radius portion, a drive side transition, an inner transition radius, and a reverse drive portion, wherein each lobe has a tapering height and width with a substantially constant ratio of lobe width to lobe height, wherein the driver lobes have a side wall defined by the outer radius portion with a taper angle relative to the rotational axis less than or equal to the taper angle of the recess side wall, and wherein the outer radius portion of the driver comprises a first convex segment, a concave segment, and a second convex segment, and the outer radius portion of the recess is configured to mate with the outer radius portion of the driver.

2. The fastener system of claim 1, wherein the driver side wall has a taper angle of about 60° from the rotational axis.

3. The fastener system of claim 1, wherein the driver side wall has a taper angle of about 42° from the rotational axis.

4. The fastener system of claim 1, wherein the taper angle of the driver side wall is at least 10° less than the taper angle of the recess side wall.

5. The fastener system of claim 1, wherein the drive side transition is linear and defines a drive angle relative to a radial line extending from the rotational axis and tangent to the inner transition radius.

6. The fastener system of claim 5, wherein the drive angle is between about 0° and 5°.

7. The fastener system of claim 5, wherein the drive side transition has a length between about 20% and 60% of the lobe height.

8. The fastener system of claim 1, wherein the inner transition radius comprises a first segment defined by a first radius and a second segment defined by a second radius greater than the first radius.

9. The fastener system of claim 1, wherein the driver comprises a tip portion and the outer transition radius is tapered at about 140° in the tip portion.

10. The fastener system of claim 1 further comprising a plurality of additional fasteners of different sizes, each of the plurality of fasteners having at least one cross section of a recess that is substantially the same as a cross section of the recess of the fastener, wherein the driver is configured to transmit torque to each of the fasteners.

11. The fastener system of claim 1, wherein the fastener has a major thread diameter smaller than 0.039 inch (1.0 millimeter).

12. The fastener system of claim 1, wherein the fastener has a major thread diameter smaller than 0.063 inch (1.6 millimeter).

13. The fastener system of claim 1, wherein the drive side transition of the driver is adapted to engage the drive side transition of the fastener at a lift angle less than 2° to reduce cam out.

14. The fastener system of claim 1, wherein the reverse drive portion of the driver comprises a concave portion and catch portion, wherein the catch portion defines a reverse drive angle.

* * * * *